US012222101B2

(12) United States Patent
Axelbaum et al.

(10) Patent No.: US 12,222,101 B2
(45) Date of Patent: Feb. 11, 2025

(54) MODULAR PRESSURIZED COAL COMBUSTION (MPCC) FOR FLEXIBLE GENERATION

(71) Applicants: Richard Axelbaum, St. Louis, MO (US); Zhiwei Yang, St. Louis, MO (US); Piyush Verma, St. Louis, MO (US)

(72) Inventors: Richard Axelbaum, St. Louis, MO (US); Zhiwei Yang, St. Louis, MO (US); Piyush Verma, St. Louis, MO (US)

(73) Assignee: Washington University, St. Louis, MO (US)

( * ) Notice: Subject to any disclaimer, the term of this patent is extended or adjusted under 35 U.S.C. 154(b) by 480 days.

(21) Appl. No.: 16/938,725

(22) Filed: Jul. 24, 2020

(65) Prior Publication Data

US 2021/0025585 A1    Jan. 28, 2021

Related U.S. Application Data

(60) Provisional application No. 62/880,558, filed on Jul. 30, 2019, provisional application No. 62/878,063, filed on Jul. 24, 2019.

(51) Int. Cl.
*F23C 9/00* (2006.01)
*F22B 1/22* (2006.01)
(Continued)

(52) U.S. Cl.
CPC ............. *F23C 9/003* (2013.01); *F22B 1/22* (2013.01); *F23C 6/00* (2013.01); *F23C 99/00* (2013.01);
(Continued)

(58) Field of Classification Search
CPC ...................................................... F23C 9/003
See application file for complete search history.

(56) References Cited

U.S. PATENT DOCUMENTS

| 2,968,288 | A | * | 1/1961 | Daman | ............... F23C 6/00 60/39.182 |
| 4,556,384 | A | * | 12/1985 | Laurenceau | ............... F23D 1/00 239/132.3 |

(Continued)

*Primary Examiner* — Jason Lau

(57) ABSTRACT

A modular combustion system for flexible energy generation is provided. The system comprises a plurality of combustion boilers, at least one oxidizer supply unit providing an oxidizer stream to the combustion boilers, at least one feeder to provide fuel to the combustion boilers, at least one particle removal unit to remove particles from a flue gas output stream from the combustion boilers, and a pollution removal unit to remove pollutant gases from the flue gas output stream. A process for flexible energy generation using the modular combustion system is disclosed that includes providing an oxidizer stream to a plurality of combustion boilers with at least one oxidizer supply unit, providing fuel to the plurality of combustion boilers with at least one feeder, removing particles from a flue gas output stream from the plurality of combustion boilers with at least one particle removal unit, and removing pollutant gases from a particle-free flue gas output stream with at least one pollution removal unit. A system for controlling wall heat flux in a pressurized coal combustion environment is disclosed that includes at least one burner; and at least one low-mixing, axial-flow boiler.

5 Claims, 16 Drawing Sheets

(51) Int. Cl.
*F23C 6/00* (2006.01)
*F23C 99/00* (2006.01)
*F23J 15/02* (2006.01)
*F23J 15/06* (2006.01)
*F23K 3/00* (2006.01)
*F23L 7/00* (2006.01)
*F22B 9/00* (2006.01)

(52) U.S. Cl.
CPC ............ *F23J 15/02* (2013.01); *F23J 15/025* (2013.01); *F23J 15/06* (2013.01); *F23K 3/00* (2013.01); *F23L 7/007* (2013.01); *F22B 9/00* (2013.01); *F23C 2202/00* (2013.01)

(56) References Cited

U.S. PATENT DOCUMENTS

| | | | |
|---|---|---|---|
| 7,458,218 B2 | 12/2008 | Kalina | |
| 8,246,343 B2 * | 8/2012 | Ghani | ...................... F23N 5/006 |
| | | | 431/351 |
| 8,393,065 B2 * | 3/2013 | Tatsumi | .................. F23C 9/003 |
| | | | 29/890.051 |
| 9,243,799 B2 * | 1/2016 | D'Agostini | ................ F23C 6/04 |
| 2015/0013300 A1 * | 1/2015 | Axelbaum | ................ F22B 1/22 |
| | | | 110/297 |
| 2016/0045841 A1 | 2/2016 | Kaplan | |
| 2017/0363284 A1 * | 12/2017 | Axelbaum | .............. F23N 3/087 |

* cited by examiner

MODULAR PRESSURIZED COAL COMBUSTION (MPCC) FOR FLEXIBLE GENERATION

CROSS-REFERENCE TO RELATED APPLICATIONS

This application claims priority from U.S. Provisional Application Ser. No. 62/878,063 filed on Jul. 24, 2019, which is incorporated herein by reference in its entirety. This application further claims priority from U.S. Provisional Application Ser. No. 62/880,558 filed on Jul. 30, 2019, which is incorporated herein by reference in its entirety.

STATEMENT REGARDING FEDERALLY FUNDED RESEARCH AND DEVELOPMENT

This invention was made with government support under RFP-89243319CFE000026, DE-FE0009702, and DE-FE0029087 awarded by the U.S. Department of Energy. The government has certain rights in the invention.

BACKGROUND OF THE DISCLOSURE

The field of the disclosure relates generally to fuel combustion systems. More specifically, the field of the disclosure relates to modular coal combustion systems for flexible energy generation.

The rapid addition of intermittent renewable energy (IRE) has created a growing need for responsive, dispatchable generation to provide grid stability. However, existing coal power plants, which have been pressed into operating more flexibly than originally designed in response to the growth of IRE, are being retired at alarming rates due in some cases to not being cost competitive (e.g., in the U.S., where cheaper natural gas power often prevails), environmental concerns, or not being able to be flexible enough, and these retirements are putting the reliability of the grid at risk. Moreover, coal adds to the diversity of the overall generational mix, an important hedge against future changes, e.g., price volatility of natural gas. In view of this, a new breed of coal power plants is needed that is clean, efficient and flexible to meet the changing market demands. Also, due to the impact of $CO_2$ on climate change, the potential to include or be retrofitted a carbon capture plant is also an important feature for future coal power plants.

In various aspects, the disclosed systems are designed to address this need. The systems and methods described herein are intrinsically modular in design and flexible. In various aspects, the system can be designed as a plant without carbon capture, where the combustion boilers are operated in air-fired mode, or as a plant with carbon capture, where the combustion boilers are operated in oxy-combustion mode. If designed as a plant without carbon capture, the system can also be retrofitted to a plant with carbon capture at a later time. If designed as a plant with carbon capture, the system can include oxidizer storage (either liquid or gas) to further improve flexibility of the system. In addition, the system, whether in air-fired mode or oxy-combustion mode, can be operated either at atmospheric pressure or under pressure. Under pressure, the system can include an integrated pollutant removal unit to recover the latent heat of the moisture in the flue gas to improve the plant efficiency and reduce the cost for pollutant removal as well.

Due to its large reserves, ease of transportation and storage, low price, coal is expected to persist as one of main energy sources for generating power into the distant future. As more of the grid electricity is generated from intermittent renewable sources (IREs), the existing coal-fired power plants, optimized for baseload, are being increasingly relied on as load-following resources, which adds challenges to plant operations and hurts the economics of the plant. There is a need for a new concept for coal plants, where the plant will have a high efficiency (>40% HHV), increased operational flexibility with high ramp rates and minimal reduction of efficiency at part load, modular construction with low capital cost, and low emissions with the potential to be retrofitted for carbon capture without significant plant modifications. Additional features include integration with energy storage, minimized water consumption, reduced design, construction and commissioning schedules, enhanced maintenance features, integration capability with coal upgrading, and natural gas co-firing capability. The following disclosure is designed to address this need. The systems and methods described herein are intrinsically modular in design, flexible, carbon-capture ready, and have high efficiency and low water use.

BRIEF DESCRIPTION OF THE DISCLOSURE

In one aspect, a modular combustion system for flexible energy generation is disclosed. The system includes a plurality of combustion boilers operatively coupled in parallel or in series-parallel, at least one oxidizer supply unit operatively coupled to the plurality of combustion boilers, at least one feeder operatively coupled to the plurality of combustion boilers, at least one particle removal unit operatively coupled to the plurality of combustion boilers and configured to remove particles from a flue gas output stream from the plurality of combustion boilers; and a pollution removal unit operatively coupled to the at least one particle removal unit and configured to remove pollutant gases from the flue gas output stream. The at least one oxidizer supply unit provides an oxidizer stream to each of the plurality of combustion boilers in parallel or in series-parallel. The at least one feeder provides fuel to each of the plurality of combustion boilers in parallel or in series-parallel; In some aspects, the system also includes at least one compressor and at least one air separation unit operatively coupled to the at least one oxidizer supply unit. In some aspects. the system also includes at least one $CO_2$ purification unit operatively coupled to the pollution removal unit. In some aspects, the system further includes at least one gas recycle unit operatively coupled to the plurality of combustion boilers to recycle flue gas from the last stage boiler to the first stage boiler. In some aspects, the system also includes an expansion turbine operatively coupled to the at least one compressor. In some aspects, the pollution removal unit is a direct contact column. In some aspects, the oxidizer gas is selected from air and a mixture of carbon dioxide and oxygen. In some aspects, the fuel is coal.

In another aspect, a process for flexible energy generation using a modular combustion system is disclosed. The process includes, providing, with at least one oxidizer supply unit, an oxidizer stream to each of a plurality of combustion boilers arranged in parallel or series-parallel. The process also includes providing, with at least one feeder, fuel to each of the plurality of combustion boilers in parallel or series-parallel. The process also includes removing, with at least one particle removal unit, particles from a flue gas output stream from the plurality of combustion boilers. The process also includes removing, with at least one pollution removal unit, pollutant gases from a particle-free flue gas output stream received from the at least one particle removal unit.

In some aspects, removing pollutant gases with at least one pollutant removal unit includes removing pollutant gases with at least one direct contact cooling column. In some aspects, the process further includes heating, with heat from the at least one pollution removal unit, a clean particle-free flue gas output stream from the pollution removal unit, and expanding, with at least one expansion turbine, a heated clean particle-free flue gas output stream received from the pollution removal unit. In some aspects, the process further includes purifying, with at least one $CO_2$ purification unit, a clean particle-free flue gas output stream received from the pollution removal unit. In some aspects, providing oxidizer gas includes providing air. In some aspects, providing oxidizer gas includes providing oxygen, and the at least one compressor further includes at least one air separation unit. In some aspects, providing fuel includes providing coal.

In an additional aspect, a system for controlling wall heat flux in a pressurized coal combustion environment is disclosed. The system includes at least one burner and at least one low-mixing, axial-flow boiler. In some aspects, the at least one burner is configured with a co-axial flow of three concentric streams that include an inner oxidizer stream, an outer oxidizer stream, and a fuel stream between the inner and outer oxidizer streams. In some aspects, the at least one burner is configured with a co-axial flow of two concentric streams that include an inner oxidizer stream and an outer fuel stream. In some aspects, the at least one low-mixing, axial-flow boiler has a cylinder geometry combustor with water-cooled walls or a cylinder geometry combustor with an initial conical section and with water-cooled walls. In some aspects, the at least one burner uses tailored particle size distribution to control heat release and associated wall heat flux.

BRIEF DESCRIPTION OF THE DRAWINGS

The following drawings illustrate various aspects of the disclosure.

Those of skill in the art will understand that the drawings, described below, are for illustrative purposes only. The drawings are not intended to limit the scope of the present teachings in any way.

DETAILED DESCRIPTION OF THE DISCLOSURE

Modular Coal Combustion Plant (MCCP)

Figure 12:
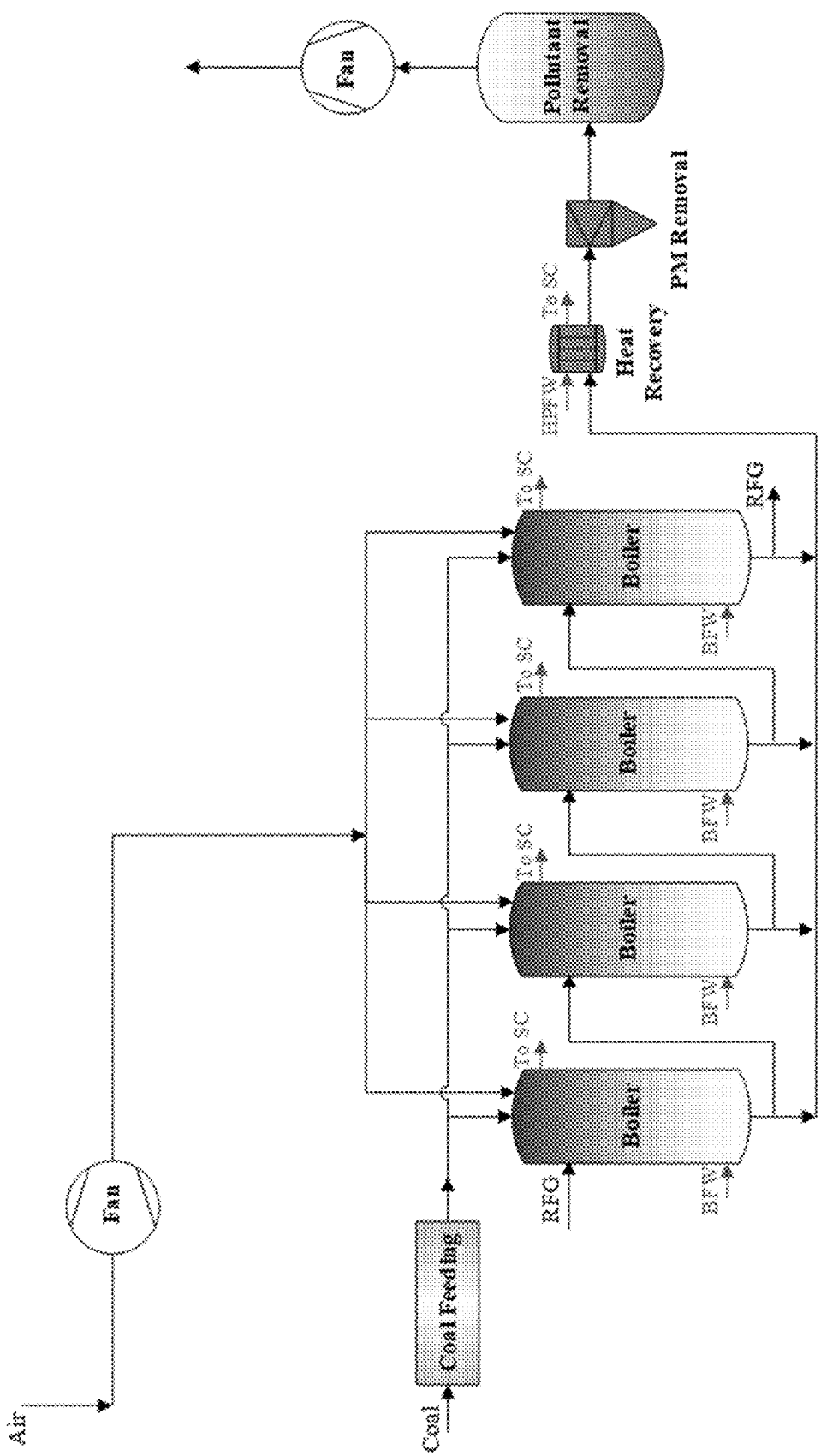
FIG. 12 is a simplified process flow diagram illustrating an atmospheric pressure MCCP with four modular boilers and without carbon capture in accordance with the present disclosure.

In various aspects, a Modular Coal Combustion Plant (MCCP) is disclosed that incorporates coal combustion with a modular boiler design, and can be designed with or without carbon capture, and under atmospheric pressure or elevated pressure. A high-level process flow diagram for a MCCP plant with carbon capture operated under atmospheric pressure is given in FIG. 12. FIG. 12 is an exemplary embodiment of a simplified process flow diagram for a modular coal combustion plant (four modular boilers) without carbon capture in accordance with the present disclosure. In various aspects, the process consists of multiple combustion boilers arranged in parallel. As illustrated in FIG. 12, four boilers are included, although the MCCP may include less than 4 boilers or greater than 4 boilers, depending on the application. Air is fed into each of the boilers in roughly equal amounts via a draft fan. Pulverized coal is delivered via a feeder with a small amount of carrier gas. Coal is also delivered to each of the boilers in roughly equal amounts. In some aspects, the boilers of the MCCP nominally have the same design and operating conditions. In each boiler, the heat of combustion is transferred to a power cycle to generate electricity. In various aspects, the power cycle can be any suitable power cycle including, but not limited to, a supercritical (SC) steam-Rankine cycle (shown in FIG. 12), a high-efficiency advanced ultra-supercritical (A-USC) steam-Rankine cycle, an indirect-fired supercritical CO2 cycle, or another power cycle.

Referring again to FIG. 12, downstream of the boilers the flue gas streams can be combined and fed into a heat recovery unit. In the heat recovery unit, heat is extracted and integrated into the power cycle and the flue gas is cooled to above the acid dew point temperature. After the heat recovery unit, fly ash particles in the flue gas are removed by a particle removal unit. For a plant operated at atmospheric pressure, the particle filter can be any suitable particle filter including, but not limited to, an electrostatic precipitator or a baghouse. After particulate removal, the flue gas is further cooled in a pollutant removal unit. The pollutant removal unit can be any suitable unit including, but not limited to, a flue gas desulfurization system.

Compared with conventional coal-fired power plants, the atmospheric pressure, non-carbon-capture plant described above (see FIG. 12) has improved operating flexibility. The minimal load for a conventional coal-fired power plant is typically ~40%. There is an efficiency drop at part-load operation, due in part to the mismatch of heat transfer in the radiant and convective sections of the boiler in conventional coal-fired power plant. For the MCCP described above, 25% load can be easily achieved by just shutting down three boiler modules. The efficiency drop caused by heat transfer mismatch can be minimized as the operating condition of the remaining module is full load. Thus, a much deeper turn-down can be achieved with the modular design of the MCCP. Also, the ramp rate and cool/warm start-up time of the MCCP is also higher than a conventional coal-fired plant since the size of each MCCP boiler module is relatively small.

Figure 13:
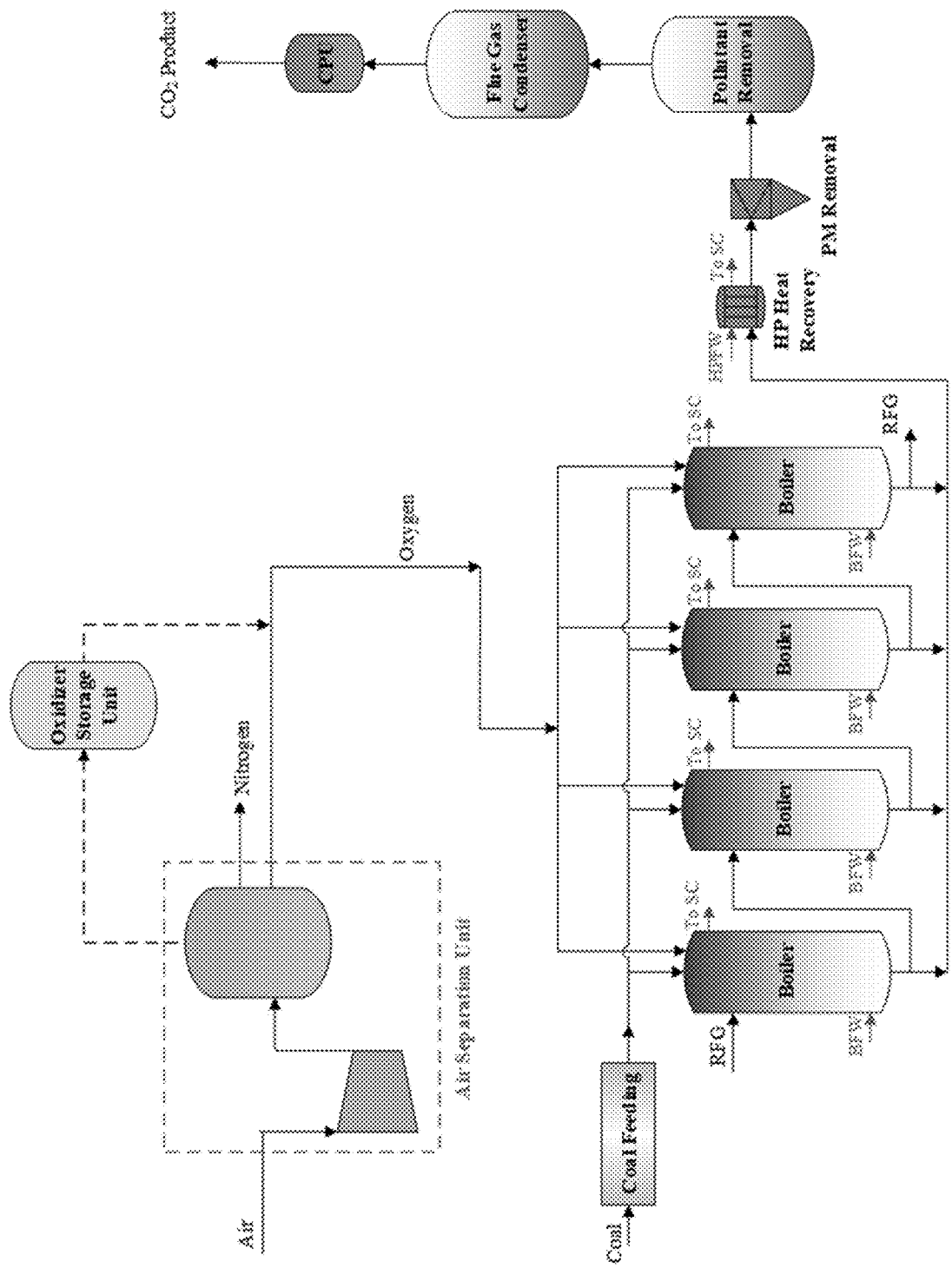
FIG. 13 is a simplified process flow diagram illustrating an atmospheric pressure MCCP with four modular boilers and with carbon capture in accordance with the present disclosure.

FIG. 13 is a simplified process flow diagram for an MCCP (four modular boilers) with carbon capture operated under atmospheric pressure in accordance with the present disclosure. As illustrated in FIG. 13, the process is implemented using multiple combustion boilers arranged in series-parallel configuration. Air is fed into an air separation unit via a compressor to generate oxygen. Oxygen is fed into each of the boilers in roughly equal amounts. Pulverized coal is delivered via a feeder with a small amount of carrier gas. Coal is also delivered to each of the boilers in roughly equal amounts. A certain amount of the flue gas from all boilers is recycled back into the first stage boiler to act as an inert gas to reduce the combustion temperature and hence wall heat flux. The partially cooled flue gas of this stage is separated into two streams. One stream is transferred to the next stage, where more fuel and oxygen are fed. This part of flue gas acts as an inert gas to reduce the combustion temperature of the next stage. The other stream flows directly to the flue gas heat recovery unit downstream. This process is repeated in subsequent stages until all the fuel and nearly all the oxygen are consumed.

In this aspect, all boilers are operated in oxy-combustion mode. By adjusting the mass flow rates of the flue gas fed into the second, third and fourth stages, and adjusting the coal and oxygen distributions among stages, all stages operate at similar conditions, which allows for a modular design for all boilers in some aspects. Downstream of the boilers, the flue gas streams from all boilers are combined and fed into a heat recovery unit. In this unit, heat is extracted and integrated into the power cycle and the flue gas is cooled to above the acid dew point temperature. After the heat recovery unit, fly ash particles in the flue gas are removed by a particle removal unit. For a plant operated at atmospheric pressure, the particle filter may be any suitable filter including, but not limited to, an electrostatic precipitator or a baghouse. After particulate removal, the flue gas is further cooled in a pollutant removal unit and flue gas condenser, where the pollutant gases and moisture in the flue gas stream are removed, respectively. The pollutant removal unit can be any suitable system including, but not limited to, a flue gas desulfurization system. The flue gas output stream from the flue gas condenser is fed into a $CO_2$ purification unit (CPU) to produce $CO_2$ that is ready for transportation, utilization and/or storage.

Similar to the non-carbon-capture MCCP illustrated in FIG. 12, the above carbon-capture MCCP described above (see FIG. 13) also has improved operating flexibility compared with conventional oxy-combustion plants, due to the modular boiler design. In addition, the carbon-capture MCCP can incorporate an oxygen storage tank to further improve the flexibility of the system, as shown in FIG. 13. During the hours of low load, the ASU operates at the rated capacity, however, the power plant can be turned down to follow the required load. The extra oxygen produced during this period can be stored for subsequent use. Since the ASU load will remain constant even during the turndown period, the overall electricity production can be further minimized, providing the capacity for the MPPC power plant to follow steeper load changes. During the period of high demand for electricity, the power plant can be operated at a higher capacity while keeping the ASU load constant. The excess oxygen required to turn up the output can be provided by the stored oxygen in some aspects. Since the ASU load will remain constant during high load period, the maximum electricity production will be higher than the high-load power plant capacity, again providing higher load coverage. A typical start-up of an existing oxy-combustion power plant requires an oxygen storage of at least 8 hours of full load operation. Calculations based on load following using the MCCP described above suggest that an oxygen storage capacity of 0.5-2 hours of full load can follow a typical day of load change without changing the ASU load.

Compared with conventional oxy-combustion plants, the MCCP described above also has higher efficiency, as the flue gas recycle ratio can be greatly reduced. Typically, for a conventional oxy-combustion plant, a flue gas recycle ratio of around 70% is required to reduce the oxygen concentration at the inlet of the boiler to acceptable levels (~30%). This means that if the mass flow rate of the final combustion product transferred to downstream is Q, the mass flow rate of the recycled flue gas will be around 2.3 Q. This large amount of flue gas recycle associated with the operation of conventional oxy-combustion plants significantly reduces plant efficiency and increases cost. For the process shown in FIG. 13, since only the first stage boiler needs recycled flue gas to dilute the oxygen (the later stages use the flue gas from previous stages to dilute oxygen), a flue gas recycle ratio of 33% is all that is necessary to achieve 30% oxygen concentration at the inlet of each boiler. For the MCCP system in this aspect, if the mass flow rate of the final combustion product is Q, the mass flow rate of the recycled flue gas is only 0.5 Q, which is about ⅕th of that in existing oxy-combustion plants. Accordingly, the efficiency loss caused by flue gas recycle is reduced by ⅘ths. Additional calculations indicate that by reducing the recycle ratio from 70% to 30%, the net plant efficiency can increase by ~3 percentage point.

Figure 14:
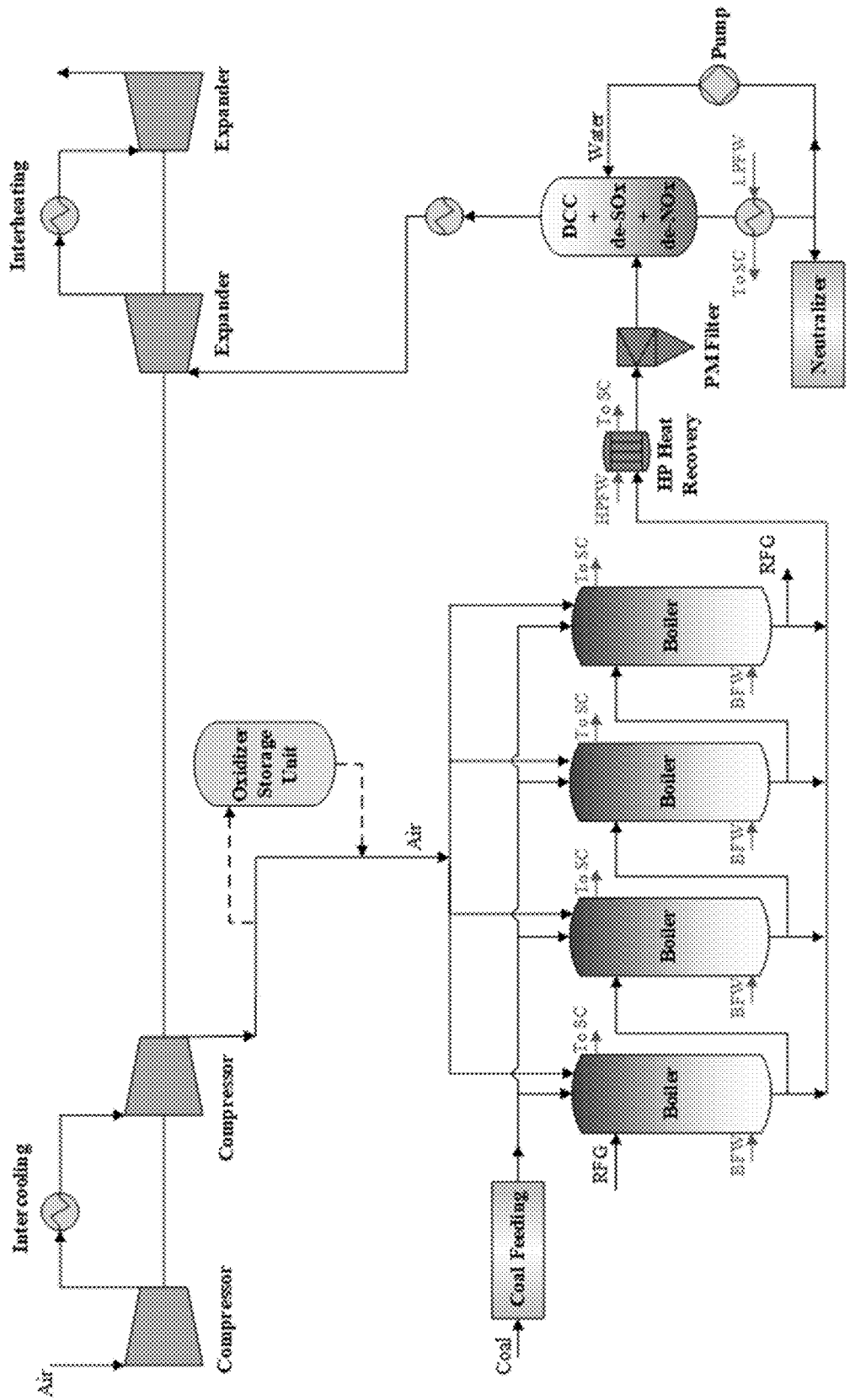
FIG. 14 is a simplified process flow diagram illustrating a pressurized MCCP with four modular boilers and without carbon capture in accordance with the present disclosure.

FIG. 14 is a simplified process flow diagram for an MCCP (four modular boilers) without carbon capture operated under pressure in accordance with the present disclosure. The process makes use of multiple combustion boilers arranged in parallel configuration. Air is compressed with a single- or multi-stage compressor before entering each of the boilers in roughly equal amounts. Coal is delivered via a feeder with a small amount of carrier gas. Coal is also delivered to each of the boilers in roughly equal amounts. In some aspects, the boilers nominally have the same design and operating conditions. In various aspects, the pressure in the boilers can range from about 10 to about 40 bar (absolute). In one aspect, as illustrated in FIG. 14, 16 bar (absolute) pressure is used. Downstream of the pressurized boilers, the flue gas streams are combined and fed into a pressurized heat recovery unit. In this unit, heat is extracted and integrated into the power cycle and the flue gas is cooled to above the acid dew point temperature. After the pressurized heat recovery unit, fly ash particles in the flue gas are removed by a particle removal unit, which may be any suitable device including, but not limited to, a pressurized electrostatic precipitator or a particle filter. After particulate removal, the flue gas is further cooled in a pollutant removal unit. The pollutant removal unit can be any suitable system including, but not limited to, a single, direct-contact cooling (DCC) column, in which the flue gas flows against a stream of cooler water, thereby reducing the flue gas temperature and resulting in condensation of the flue gas moisture. Because the water dew point temperature increase with pressure, at the boiler's operating pressure (for example, 16 bar), the water leaving the bottom of the column is at sufficiently high temperature that can be used for boiler feed water heating and the plant thermal efficiency is improved. Due to the high-pressure operation, sulfur- and nitrogen-containing species are dissolved in the cooling water and may be removed in this state. This process of pollutant removal, which is effective only under pressure, combined with latent heat recovery, can greatly reduce the cost for pollutant removal.

Referring again to FIG. 14, after the pollutant removal unit, the clean, particle-free flue gas is heated back to a higher temperature using part of the pollutant removal unit heat or other heat sources. The heated flue gas then goes through a single- or multi-stage expansion turbine to produce power. If multi-stage compressors and multi-stage expansion turbines are employed, the compression heat will be recovered by intercooling and then this heat will be used to heat the flue gas between turbine stages to increase the power output. In this way, most of the work used by the compressors is compensated by the power generated from the expansion turbines. The remaining part of the compressor work becomes the auxiliary load of the plant.

In various aspects, the pressurized MCCP system has several important advantages over the conventional atmospheric-pressure PC plant. Advantages include:

1) Higher efficiency through recovering flue gas latent heat—As mentioned above, with high pressure, the latent heat from the flue gas can be utilized to increase plant efficiency. The temperature at which moisture condensation occurs in the flue gas is strongly dependent on operating pressure. The significant increase in condensation temperature makes it feasible to utilize the latent heat at pressure. Also, the extra power produced by integrating this latent heat into the power cycle is considerably higher than the net auxiliary load for pressurization, so that a power plant incorporating the proposed concept has a higher plant efficiency. Calculations show that, for the plant configuration shown in FIG. 12, the proposed plant has ~1.3 percentage points increase in plant efficiency compared with a conventional PC plant utilizing a similar steam cycle.

2) Economical pollutant removal—In a pressurized system, $SO_x$ and $NO_x$ and some mercury can be removed simultaneously in a cooling column. The advantages of this approach over others include: 1) the capture of $SO_x$ and $NO_x$ occurs simultaneously, which is more economical than separate removal processes such as selective catalytic reduction (SCR) for $NO_x$ removal and sorbent injection for $SO_2$; 2) large pieces of equipment, like $SO_x$ scrubbers and SCRs, are eliminated, resulting in significant capital cost savings; and 3) acid gas condensation is controlled to occur only in a single vessel, eliminating the chances of corrosion in other parts of the system.

3) Reduced gas volume—Compared with atmospheric pressure PC combustion, the overall volume of gas is significantly reduced in a pressurized system. This provides further opportunity to reduce the size of the boiler, pumps, and other equipment. Heat loss to the ambient is also reduced. Importantly, the volume of gas undergoing treatment for removal of ash and other contaminants is reduced, while the concentrations of these contaminants is increased, making their removal easier and more cost effective.

4) Improved coal combustion rate—In coal-fired combustion systems, the amount of air supplied is kept to a minimum to avoid efficiency loss and to minimize the auxiliary load associated with air delivery. In addition, it is important to keep the amount of unburned carbon in the fly ash below levels required for fly ash reuse applications. In a conventional PC plant, the oxygen concentration in the flue gas is normally kept above a minimum value, typically 2.5 vol %. However, studies have shown that coal conversion rates under pressurized conditions are higher, because both char oxidation and gasification rates increase, as demonstrated in the Examples below. Also, the gas volume in a boiler decreases proportionally with pressure, reducing velocity and increasing residence time. This further increases the coal conversion at the exit of the boiler. Therefore, the oxygen concentration in the flue gas can be smaller in a pressurized boiler, effectively reducing the amount of air needed. In addition, with enhanced coal combustion rate, the coal particle size can be larger, which means the auxiliary load for coal pulverizing can be reduced.

5) Increased combustion performance of lower-quality fuels—Some low-rank fuels, such as lignite, have limited use due to their high moisture and low energy content. Since much of the latent heat in the flue gas can be captured in pressurized combustion, the effective heating value of "low-Btu" fuels can be significantly increased.

6) Modular boiler construction—An important advantage of the proposed process is the ability to modularize the construction of the pressurized boiler. Because of the long, thin nature of pressure vessels, they can be built in a factory using skilled labor and high-quality control procedures, and then shipped to the power plant location. This approach is particularly important to the U.S., as some recent advanced coal technology projects have encountered construction delays and cost overruns due to the inability to ensure large numbers of experienced craftsmen to work in remote, rural locations where power plants are often sited. The use of modular construction will facilitate lower construction costs, on-time and within-budget plant construction, and better quality control.

7) Improved plant flexibility—Compared with a conventional PC power plant, the operating flexibility of the proposed plant is increased due to the series-parallel boiler design. The minimal load for a typical conventional PC plant is ~25%. There is an efficiency drop at part-load operation, due in part to the mismatch of heat transfer in the radiant and convective sections of the boiler. For the proposed conceptual plant, 25% load can be easily achieved by just shutting down three boiler modules. The efficiency drop caused by heat transfer mismatch can be minimized as the operating condition of the remaining module is full load. Thus, a much deeper turn-down can be achieved with the modular design. Also, the ramp rate and cool/warm start-up time of the proposed conceptual plant should also be higher than a conventional PC plant since the size of each boiler module is relatively small.

Figure 15:
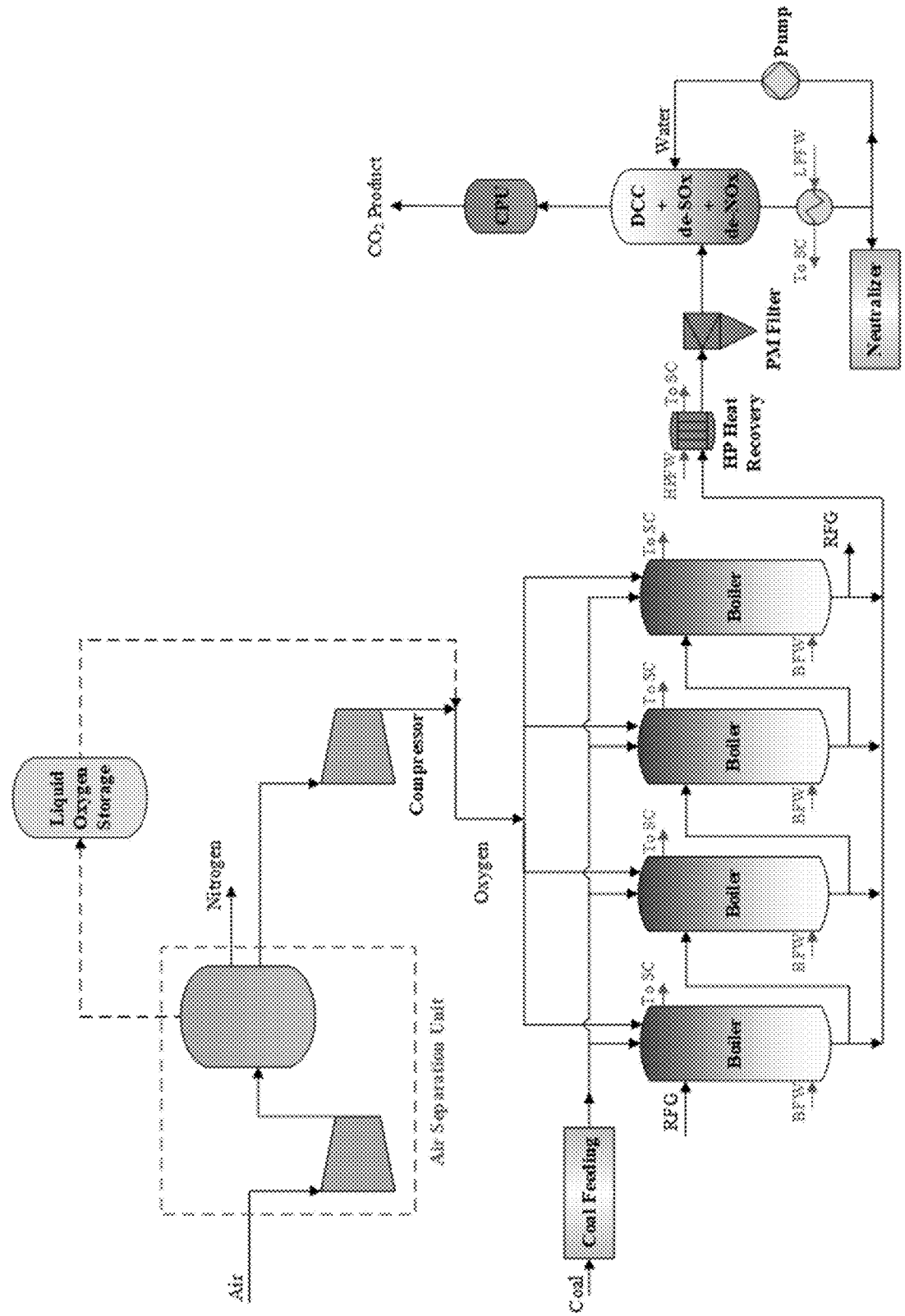
FIG. 15 is a simplified process flow diagram illustrating a pressurized MCCP with four modular boilers and with carbon capture in accordance with the present disclosure.

FIG. 15 is an exemplary embodiment of a simplified process flow diagram for a MCCP (four modular boilers) with carbon capture operated under pressure in accordance with the present disclosure. The process consists of multiple pressurized combustion boilers arranged in series-parallel configuration. Air is fed into an air separation unit via a compressor to generate oxygen. Oxygen is then compressed by an oxygen compressor and fed into each of the boilers in roughly equal amounts. Pulverized coal is delivered via a feeder with a small amount of carrier gas. Coal is also delivered to each of the boilers in roughly equal amounts. Similar to the atmospheric pressure, carbon-capture, MCCP discussed above, a certain amount of the flue gas from all pressurized boilers is recycled back into the first stage boiler to act as an inert gas to reduce the combustion temperature and hence wall heat flux. The partially cooled flue gas of this stage is separated into two streams. One stream is transferred to the next stage, where more fuel and oxygen are fed. This part of flue gas acts as an inert gas to reduce the combustion temperature of the next stage. The other stream flows directly to the flue gas heat recovery unit downstream. This process is repeated in subsequent stages until all the fuel and nearly all the oxygen is consumed. All boilers are operated in oxy-combustion mode. By adjusting the mass flow rates of the flue gas fed into the second, third and fourth stages, and adjusting the coal and oxygen distributions among stages, in some embodiments, all stages operate at similar conditions, which allows for a modular design for all boilers. While the pressure in the boilers can range from 10 to 40 bar (absolute), in the example shown in FIG. 15, 16 bar (absolute) is used. Downstream of the pressurized boilers, the flue gas streams are combined and fed into a pressurized heat recovery unit. In this unit, heat is extracted and integrated into the power cycle and the flue gas is cooled to above the acid dew point temperature. After the pressurized heat recovery unit, fly ash particles in the flue gas are removed by a particle removal unit, which can be a pressurized electrostatic precipitator or a particle filter. After particulate removal, the flue gas is further cooled in a pollutant removal unit. The pollutant removal unit can be a single, direct-contact cooling (DCC) column to remove pollutant gases and recover the latent heat of the moisture in the flue gas as well. The flue gas output stream from the pollutant removal unit is fed into a $CO_2$ purification unit (CPU) to produce $CO_2$ that is ready for transportation, utilization and/or storage. The plant can incorporate an oxygen storage tank to further improve the flexibility of the system.

Based on preliminary calculations, the net plant efficiency of the above pressurized MCCP may be 6 percentage higher than that of a conventional atmospheric pressure, oxy-combustion plants. The great efficiency improvement comes from two reasons: 1) by using the series-parallel modular boiler configuration, the flue gas recycle ratio can be reduced from 70% to 30%; 2) under pressure, by using the DCC column as the pollutant removal unit, the latent heat of the moisture in the flue gas can be recovered and used to heat and boiler feed water and improve plant efficiency. The other benefits of the non-carbon-capture, pressurized MCCP discussed above (i.e., economical pollutant removal, reduced gas volume, improved coal combustion rate, increased combustion performance of lower-quality fuels, modular boiler construction, improved plant flexibility) also applies to the carbon-capture, pressured MCCP.

The non-carbon-capture, pressurized MCCP shown in FIG. 14 can be readily retrofitted to the carbon-capture, pressurized MCCP shown in FIG. 15. This retrofitting includes at least several modifications including, but not limited to: (a) An air separation unit (ASU) is added between compressor stages to produce oxygen. For a typical cryogenic ASU, more than 98% of the energy load is for air compression. As air is already compressed in this process, the energy penalty of adding an ASU is minimal. (b) The expansion turbines are replaced by a $CO_2$ purification unit (CPU) to produce $CO_2$ that is ready for transportation, utilization and/or storage. Since the expansion turbines are removed, the compression heat extracted from the multi-stage compressors can now be integrated into the power cycle to increase power output. (c) The boilers are connected into a series-parallel configuration, in which a small amount of the flue gas coming out of the last-stage boiler is recycled back into the first stage. This recycled flue gas is used to dilute the oxygen entering the first-stage boiler. Then part of the flue gas coming out of the first-stage boiler is fed into the second stage to dilute the oxygen flow in this stage. The same process occurs for all downstream stages (i.e., oxygen is always mixed with part of the flue gas from the previous stage before it enters the present stage).

Dry-Feed Pressurized Combustion Boiler Design

Thermal radiation from a particle-laden flue gas stream can be greatly enhanced by pressure. Utilizing conventional coal combustion boiler designs under pressure can lead to excess wall heat fluxes and damages to the water-cooling walls. Therefore, a new boiler design is required for pressurized coal combustion.

A novel method is disclosed herein to control wall heat flux to within an acceptable level under pressurized coal combustion environment. This method incorporates two approaches: creating a low-mixing, axial-flow system and combusting coal particles with a tailored size distribution, to distribute heat release.

Conventional pulverized coal (PC) combustion boilers typically utilize tangential flow to enhance mixing and increase particle residence time, and also utilize very fine coal particles (typical mean and maximum sizes are around 75 μm and 200 μm, respectively) to increase burning rate. All these features are to ensure complete char combustion.

In a pressurized combustion boiler, complete char combustion is less of a concern due to the high oxygen partial pressure, high gasification rates, and longer residence time. Therefore, a low-mixing, axial-flow boiler can be utilized to distribute heat release and thus lower the peak wall heat flux. Unlike a tangentially fired combustion boiler, which releases all the combustion energy in a short distance, a low-mixing, axial-flow boiler can create a longer flame and release combustion energy in a longer distance. Also, a much wider particle size range can be utilized to help distribute heat release. Due to different heating rates, different sized particles ignite at various locations, and burn at different speeds. A wider particle size range can effectively distribute the release of the combustion energy, as illustrated in the Examples below. With a tailored particle size distribution, the heat flux profile along the height of the boiler may be modulated, providing a means of optimizing steam integration.

Figures 1A, 1B:
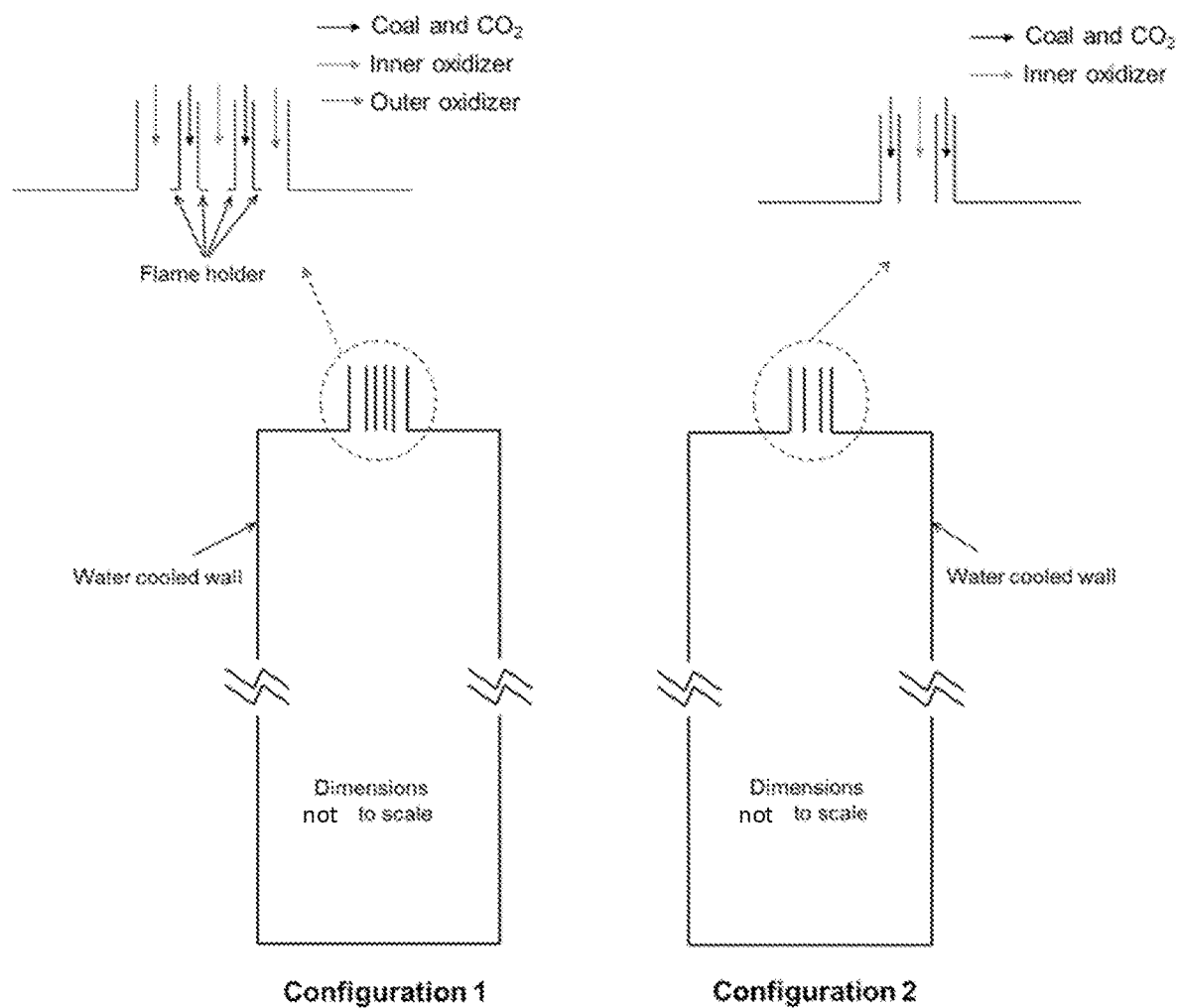
FIG. 1A is a schematic illustration of a boiler that includes a burner with a fuel port positioned between nested inner and outer oxidizer ports in accordance with one aspect of the present disclosure.
FIG. 1B is a schematic illustration of a boiler that includes a burner with an oxidizer port nested within an outer fuel port in accordance with another aspect of the present disclosure.

With above design concepts, different burner configurations can be utilized for enhanced heat flux control in a coal-fired pressurized combustion system. Non-limiting examples of burn configurations are illustrated in FIGS. 1A and 1B. The burner designs can be used independently or coupled with particle size distribution control to enhance the ability to control heat flux to the boiler tubes. This allows additional flexibility to design the boiler tubes for more efficient steam production across a wider variety of operating conditions. FIGS. 1A and 1B show two examples of burner and boiler designs. The two designs have the same boiler geometry: a cylinder combustor with water-cooled walls, but the burners have different configurations. In some aspects, the geometry of the boiler can also incorporate an initial conical section to allow for headers for water tubes to be placed near the burner. In the first burner configuration, the burner is a co-axial flow system, which consists of three streams. The inner stream is the inner oxidizer, the outer stream is the outer oxidizer, and the coal stream is between the two oxidizer streams together with a small amount of carrier $CO_2$. On both the inner and outer side of the exit of the coal stream tube, there is a flame stabilizing anchor. In the second burner configuration, there are only two streams, all the oxidizer is fed in to the center tube, coal and carrier $CO_2$ is surrounding the oxidizer. Both burner configurations can create a relatively long flame, compared with the tangentially-fired boilers typically used in conventional coal combustion boilers. The unique burner designs and use of particle distributions effectively control the burn, provide additional heat distribution control, and provide an improved alternative option to conventional SPOC process burners/boilers. In various aspects, the burner configurations described above are compatible for use with both air-fired pressurized combustion systems and oxy-coal pressurized combustion systems.

EXAMPLES

The following Examples describe or illustrate various embodiments of the present disclosure. Other embodiments within the scope of the appended claims will be apparent to a skilled artisan considering the specification or practice of the disclosure as described herein. It is intended that the specification, together with the Examples, be considered exemplary only, with the scope and spirit of the disclosure being indicated by the claims, which follow the Examples.

Example 1: Projected Cost and Performance Estimates

To evaluate the cost and performance of an air-fired pressurized MCCP as described above, the following experiments were conducted. A preliminary process analysis was carried out using plant configurations and steam cycles parameters as summarized in Table 1 below. NETL Base Case was selected as representative of a conventional supercritical (SC) steam-Rankine cycle pulverized coal (PC) plant. Case 1 employed an air-fired pressurized MCCP as described above and a SC steam cycle with single reheat. Case 2 employed an air-fired pressurized MCCP and an advanced ultra-supercritical (A-USC) steam-Rankine cycle with double reheat. The estimated performance for each of these cases is summarized in Table 1.

TABLE 1

Performance comparison for conceptual plant with different steam cycles.

| Case | Steam pressure/temperature/reheat temp | Net efficiency, HHV (%) |
|---|---|---|
| Conventional SC Power plant | 3500 psig/1100° F./1100° F./— | 40.7 |
| MPCC Case 1 | 3500 psig/1100° F./1100° F./— | 42.0 |
| MPCC Case 2 | 4200 psig/1300° F./1200° F./1200° F. | 44.3 |

The levelized cost of electricity (LCOE) for the air-fired pressurized MCCP Case 1 was expected to be less than that for a conventional PC plant with the same power cycle. Even though the air compressors and flue gas expansion turbines added capital cost to the plant, the integrated pollutant removal (IPR) unit of air-fired pressurized MCCP Case 1, which combined latent heat recovery with $SO_x$ and $NO_x$ removal in a compact direct-contact cooling (DCC) column, replaced the traditional and expensive emission control equipment of the Conventional SC Power Plant. In addition, in pressurized combustion power systems such as air-fired pressurized MCCP Cases 1 and 2, the boilers, pumps, and other equipment were smaller, and though the pressure vessels for the boilers added additional cost, the modular boiler design allowed mass production of boilers in a factory using skilled labor with high-quality control procedures, which reduced estimated construction costs. Further, for a given-sized plant (i.e., electricity output), the higher efficiency of the air-fired pressurized MCCP Cases 1 and 2 lead to lower capital and operational costs as compared to the Conventional SC Power Plant. Considering previous economic analyses conducted for oxy-fuel pressurized MCCP (Staged pressurized oxy-combustion) process (not included), the LCOE for air-fired pressurized MCCP plants is expected to be ~20% less than a conventional PC plant of comparable size and power cycle configuration.

Example 2: Effect of Fuel Particle Size Distribution on Performance of Axial Flow Boiler To evaluate the performance of a boiler with a low-mixing, axial-flow burner as described above, the following experiments were conducted.

To assess the effects of fuel particle size on wall heat flux, a simulation of combustion within a boiler with a low-mixing, axial-flow burner under oxy-combustion conditions was conducted for fuel characterized by two different ranges of particle sizes: a continuous particle size range (10-200 µm) that was representative of the fuel used in conventional PC boilers, and a bimodal particle size range (10~200 µm and 1600~2000 µm). Although the boiler design simulated in these experiments was capable of performing combustion in both air combustion mode and oxy-combustion modes, oxy-combustion typically exhibited higher radiative heat flux than air combustion due to higher $CO_2$ concentration. Therefore, oxy-combustion was used for all cases in the experiments of the present example to illustrate the effectiveness of the combustion method using the low-mixing, axial-flow burner in controlling wall heat flux.

Figure 2A:
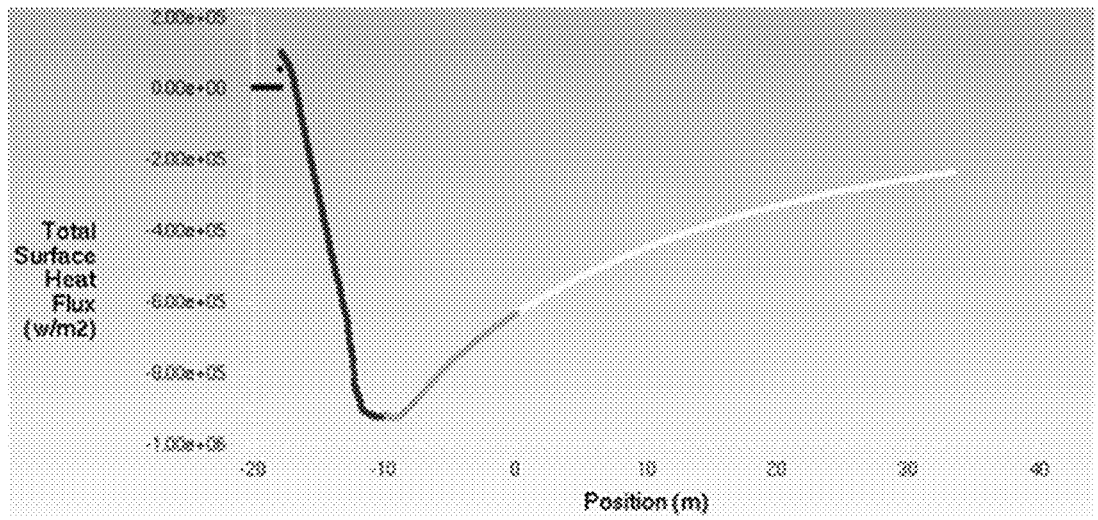
FIG. 2A is a graph summarizing wall heat flux associated with the combustion of fuel with a particle size range ranging from about 5 μm to about 200 μm, as is used in conventional pressurized combustion (PC) boilers, in a low-mixing, axial-flow boiler in accordance with one aspect of the present disclosure. Negative heat flux is associated with heat transferred from the inside (fire side) of the boiler wall to the outside (water side) of the boiler wall.
Figure 2B:
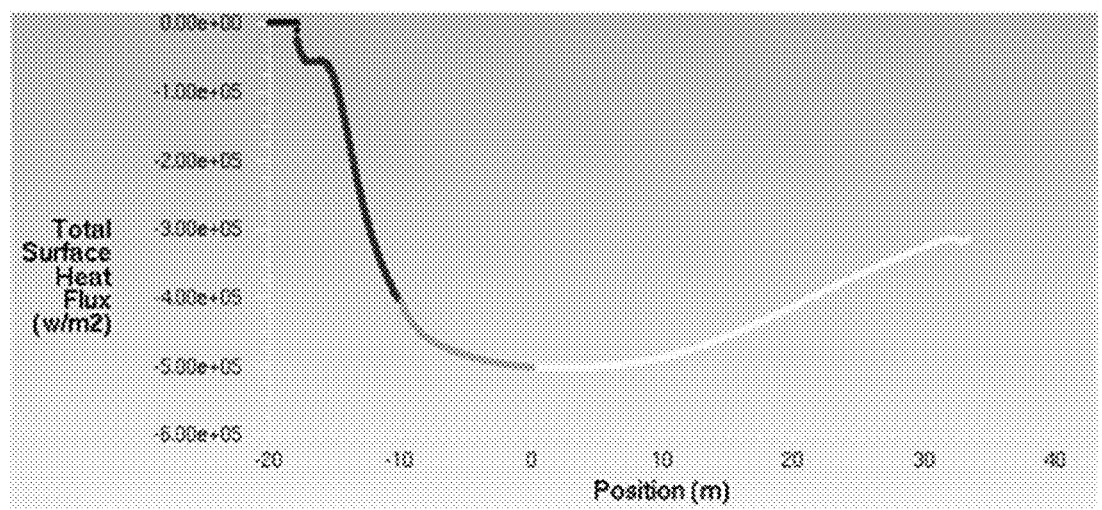
FIG. 2B is a graph summarizing wall heat flux associated with the combustion of fuel with a bimodal particle size range ranging from about 10 μm to about 200 μm and from about 1600 μm to about 2000 μm in the boiler of FIG. 2A.

FIGS. 2A and 2B summarize the simulated heat flux as a function of axial distance within the boiler. Note that negative heat flux denotes heat transfer from the inside (fire side) of the wall to the outside (water side) of the wall. FIG. 2A summarizes heat transfer estimated for combustion of fuel with the continuous particle size range (5~200 μm) and FIG. 2B summarizes heat transfer estimated for combustion of fuel with a bimodal particle size range (10~200 μm and 1600~2000 μm). As illustrated in FIG. 2A, combustion of the fuel particles with a continuous particle size distribution resulted in a relatively high and narrow peak in surface heat flux. By contrast, combustion of the fuel particles with a bimodal particle size distribution resulted in a lower magnitude, but broader distribution of surface heat flux, as illustrated in FIG. 2B.

Figure 3A:
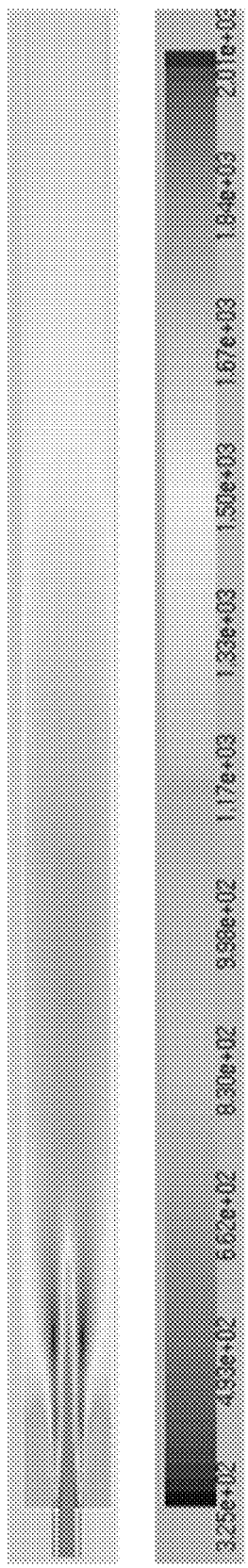
FIG. 3A is a heat map illustrating a temperature contour observed by an operational simulation of the boiler of FIG. 1A.
Figure 3B:
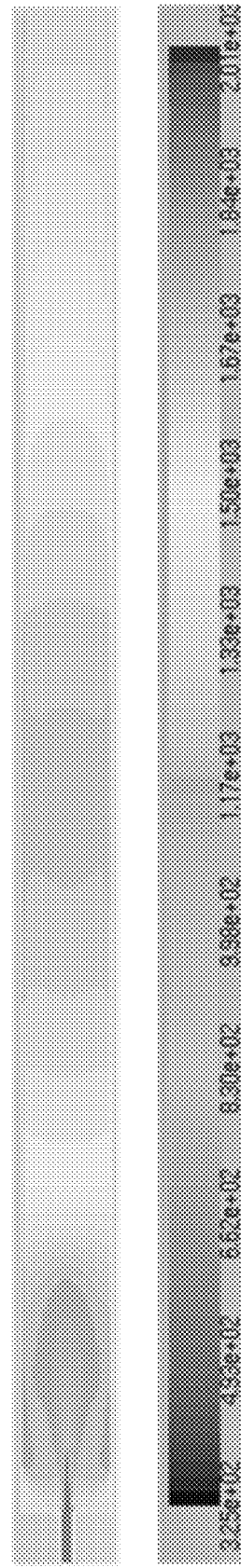
FIG. 3B is a heat map illustrating a temperature contour observed by an operational simulation of the boiler of FIG. 1B.
Figure 4A:
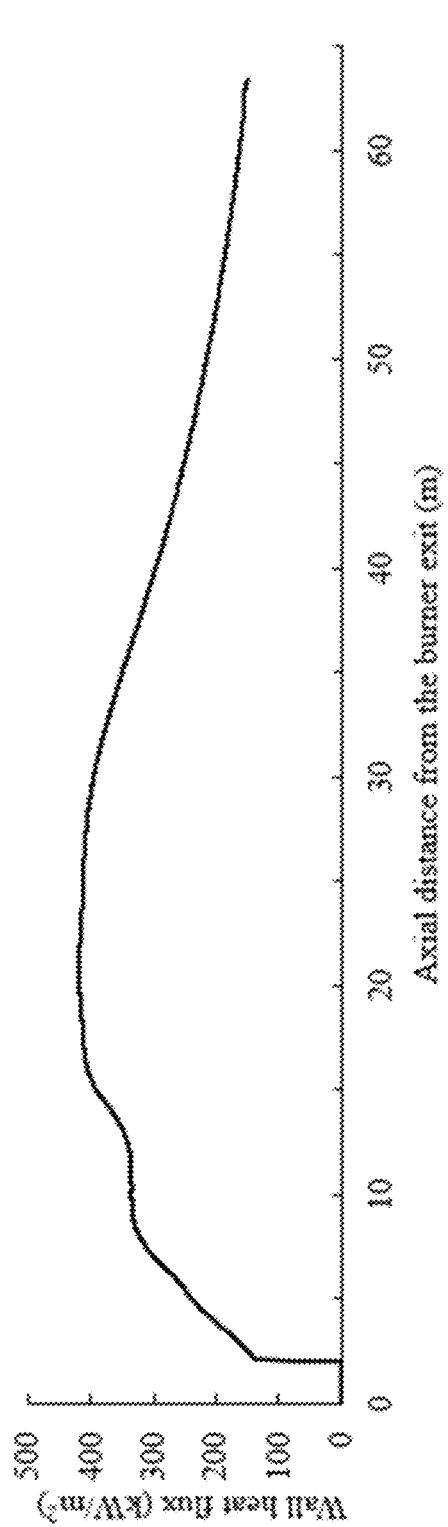
FIG. 4A is a graph summarizing the axial distribution of wall heat flux for the boiler of FIG. 1A.
Figure 4B:
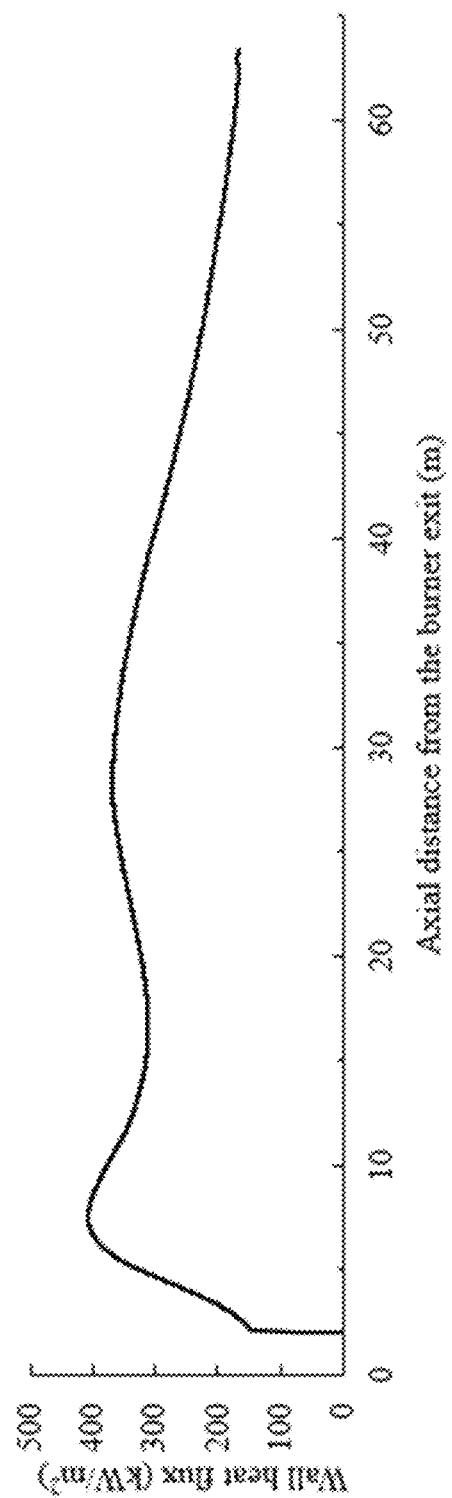
FIG. 4B is a graph summarizing the axial distribution of wall heat flux for the boiler of FIG. 1B.
Figure 5A:
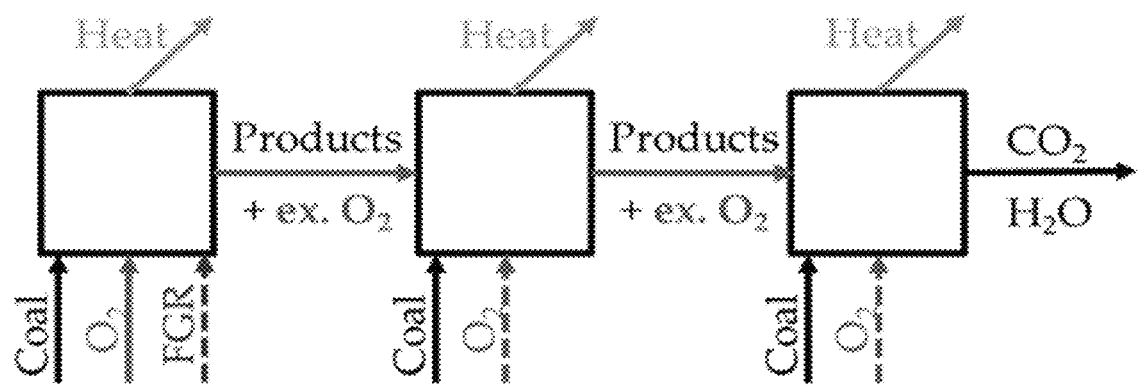
FIG. 5A is a simplified flow chart illustrating staged combustion system with flue gas recirculation.
Figure 5B:
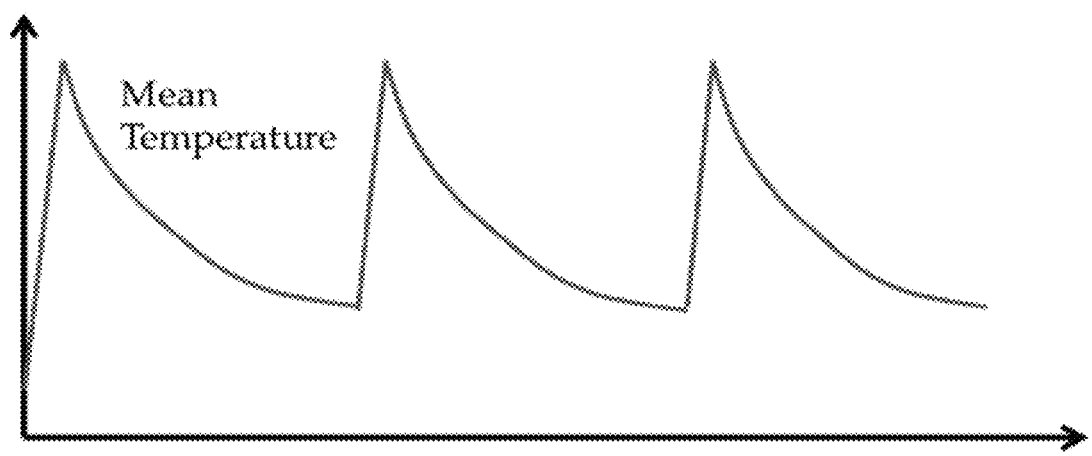
FIG. 5B is a graph illustrating a representative profile of flue gas temperature during operation of the staged combustion system of FIG. 5A.

The temperature contours and wall heat fluxes of two burner configurations, shown illustrated in FIG. 1A and FIG. 1B, were also evaluated by simulating combustion of fuel particles with a bimodal particle size range (5~200 μm and 1600~2000 μm) at an operating pressure of 15 bar. FIGS. 3A and 3B illustrate the temperature contours within the boilers with burner designs as illustrated in FIGS. 1A and 1B, respectively. FIGS. 4A and 4B are graphs summarizing the estimated wall heat flux for the boilers with burner designs as illustrated in FIGS. 1A and 1B, respectively.

Figures 6A, 6B:
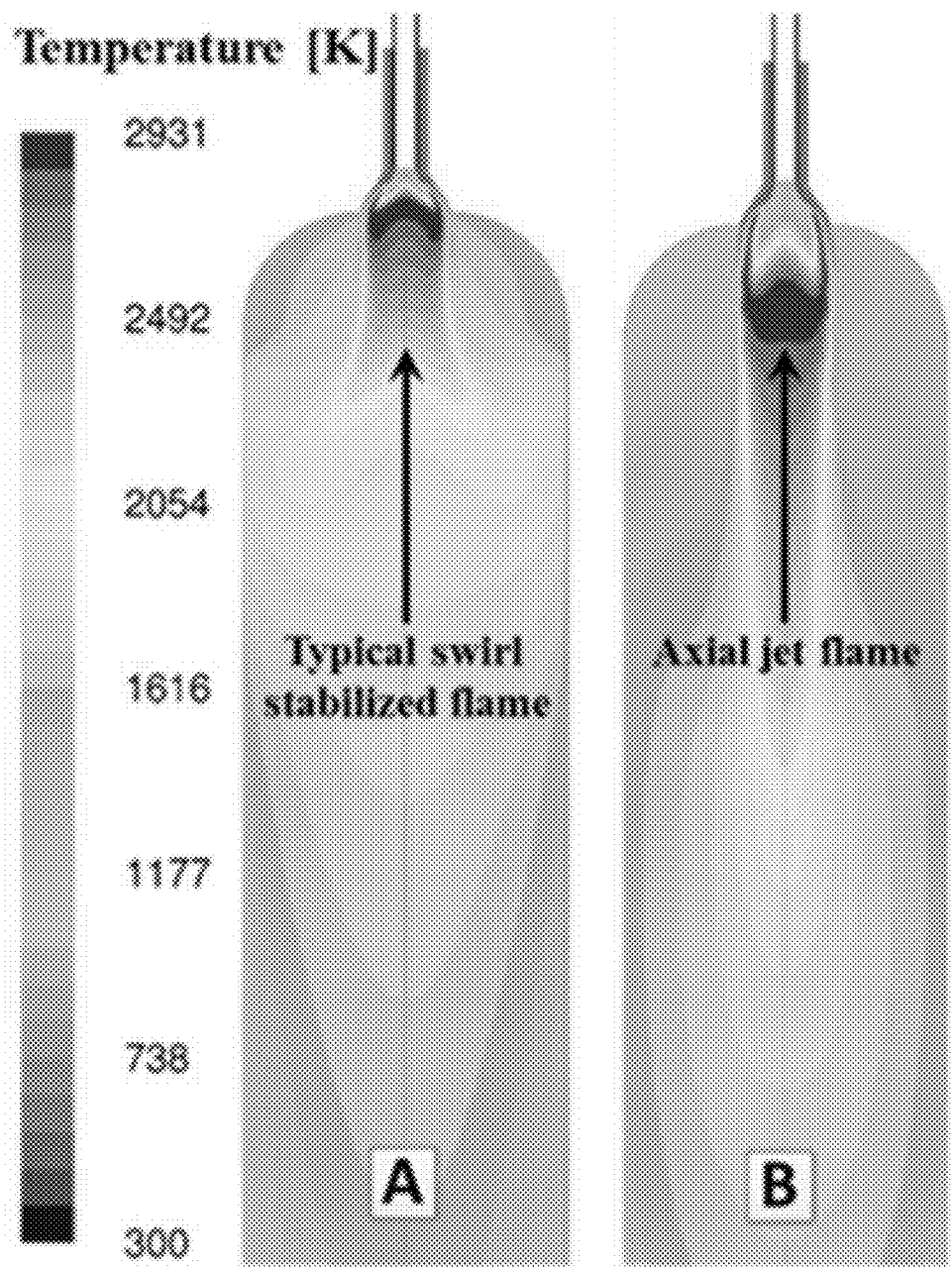
FIG. 6A is a heat map illustrating a temperature profile of a flame from a swirl stabilized burner within a boiler.
FIG. 6B is a heat map illustrating a temperature profile of a flame from an axial jet burner within a boiler.
Figure 7:
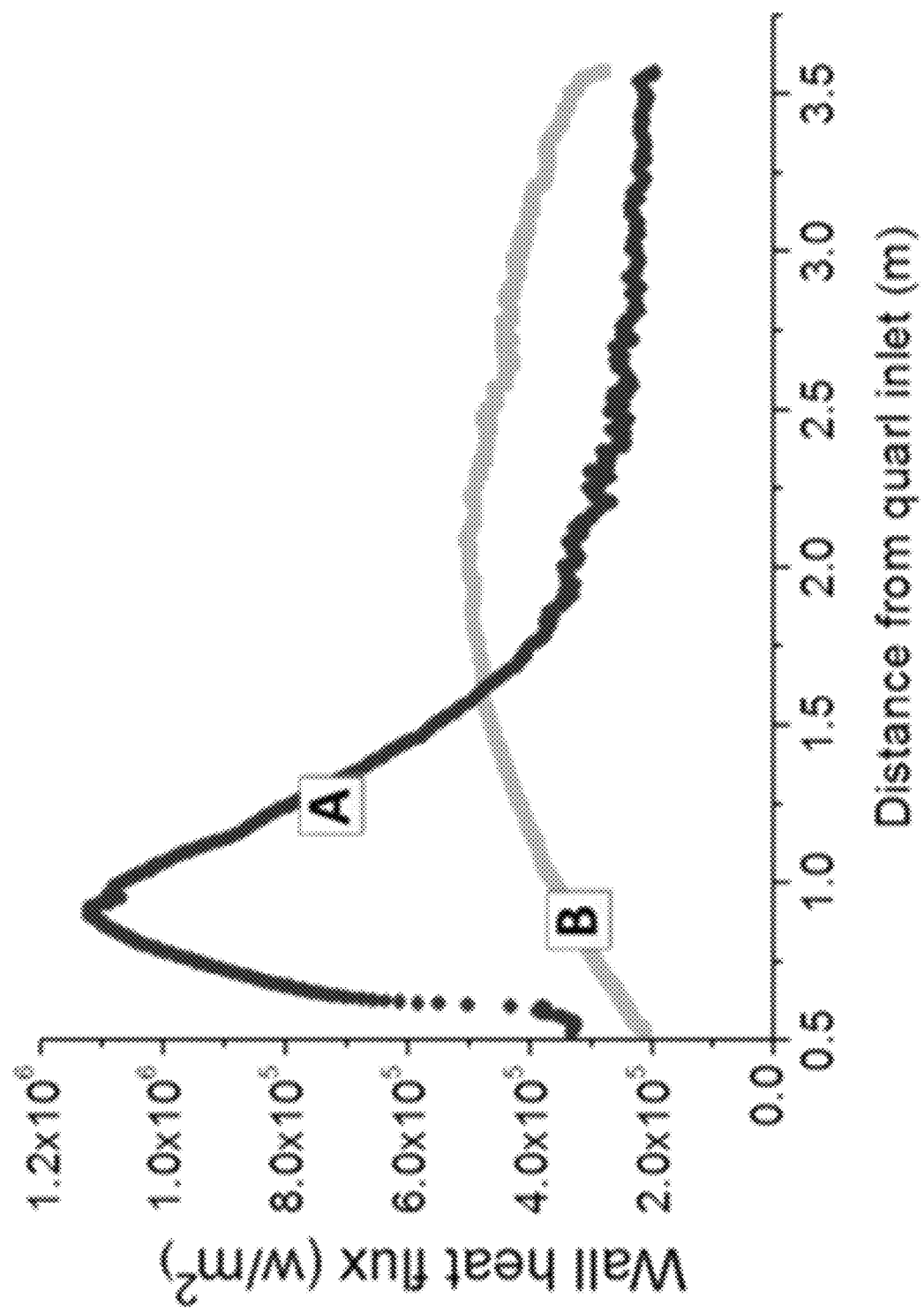
FIG. 7 is a graph comparing the wall heat flux of boilers outfitted with the swirl stabilized burner of FIG. 6A and the axial jet burner of FIG. 6B.

FIGS. 6A and 6B are thermal maps illustrating the temperature within boilers fitted with a swirl-stabilized burner and an axial jet burner, respectively. FIG. 7 is a graph comparing the axial distribution of wall heat flux corresponding to the thermal map shown in FIG. 6A (curve marked A) and corresponding to the thermal map shown in FIG. 6B (curve marked B). As illustrated in FIG. 7, the peak heat flux of the swirl-stabilized burner was higher than 800 $kW/m^2$ when operating at a pressure of about 15 bar, whereas the peak heat flux of the axial jet burner was less than 500 $kW/m^2$. FIGS. 4A and 4B show that incorporation of the burners illustrated in FIGS. 1A and 1B limited peak wall heat flux to lower than 450 $kW/m^2$, which is an acceptable level for boiler tube materials.

Example 3: Effect of Combustion Pressure on Char Burnout

To evaluate the effect of combustion pressure on char burnout, the following experiments were conducted.

A simulation of fuel particle combustion within a flue gas composition of 3 vol % of $O_2$, 6 vol % of $H_2O$ and 91 vol % of $CO_2$. Combustion reaction kinetics were modeled as simplified 1st order reactions following Smith's approach:

$$2C(s)+O_2 \rightarrow 2CO \tag{I}$$

$$C(s)+H_2O \rightarrow CO+H_2 \tag{II}$$

$$C(s)+CO_2 \rightarrow 2CO \tag{III}$$

Figure 10:
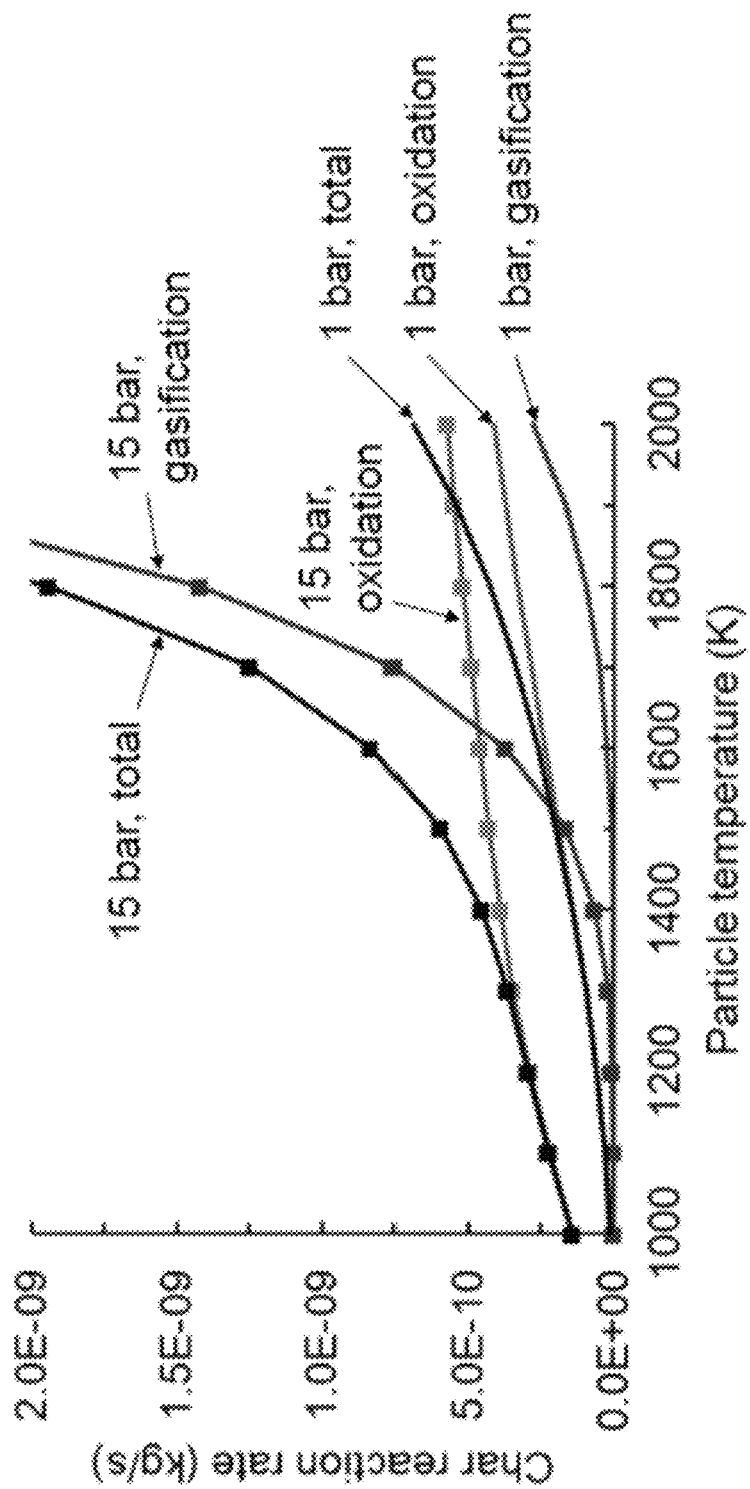
FIG. 10 is a graph summarizing char gasification and oxidation rates during operation of a boiler in accordance with one aspect of the disclosure at boiler pressures of about 1 bar and about 15 bar.
Figure 11:
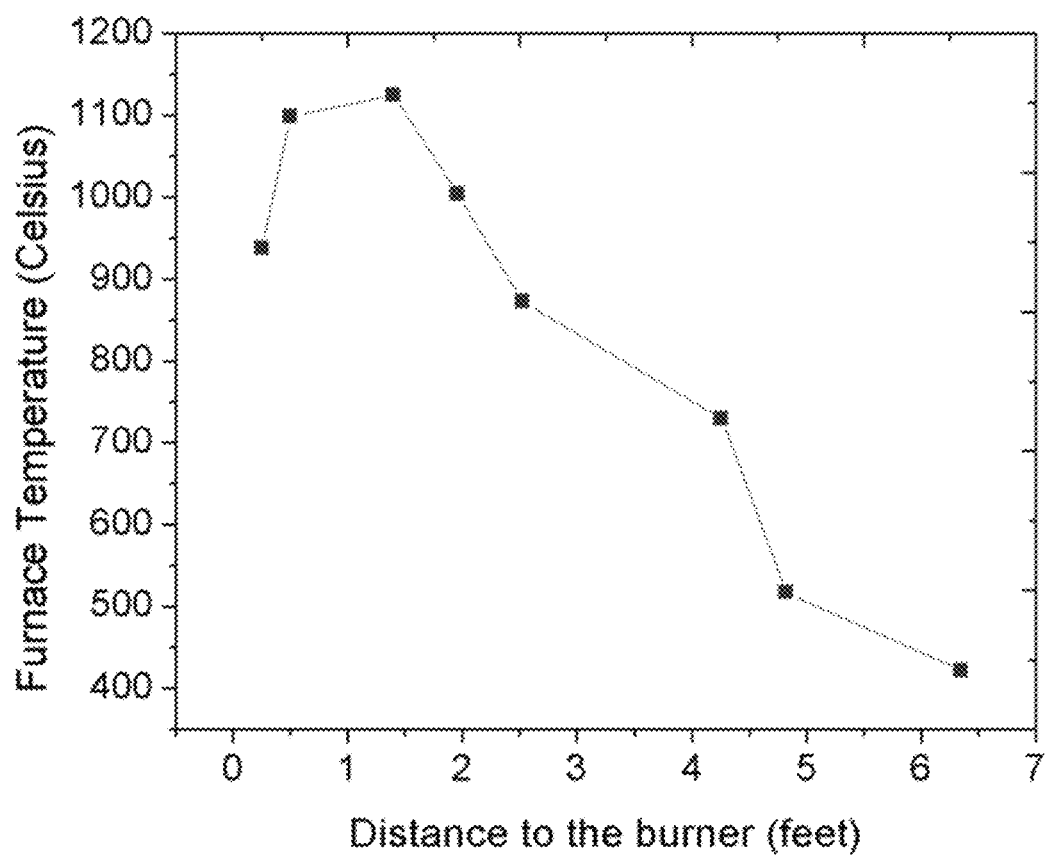
FIG. 11 is a graph summarizing a furnace wall temperature profile during operation of a boiler in accordance with one aspect of the disclosure at an energy input of about 120 kW.

FIG. 10 is a graph summarizing the char reaction rates of oxidation (reaction I), gasification (reactions II+III) and total (reactions I+II+III) at combustion pressures of 1 bar and 15 bar. As illustrated in FIG. 10, oxidation reaction rates increase modestly as combustion pressure increases from 1 bar to 15 bar, but gasification reaction rates increased dramatically for the same combustion pressure increase.

The results of these experiments demonstrated that char reaction rates for oxidation reactions were relatively insensitive to changes in combustion pressure, and that char reaction rates for gasification reactions strongly increased in response to increases in combustion pressure.

Example 4: Performance of Staged, Pressurized Oxy-Combustion (SPOC) Process

To evaluate the effect of combustion pressure on char burnout, the following experiments were conducted.

To evaluate the early-stage temperature history of fuel particles in large-scale boilers of SPOC similar to the boilers described above, a simulation of the SPOC process was conducted. To validate the simulation, experimentally-measured characteristics of boiler firing were also obtained.

Figure 8:
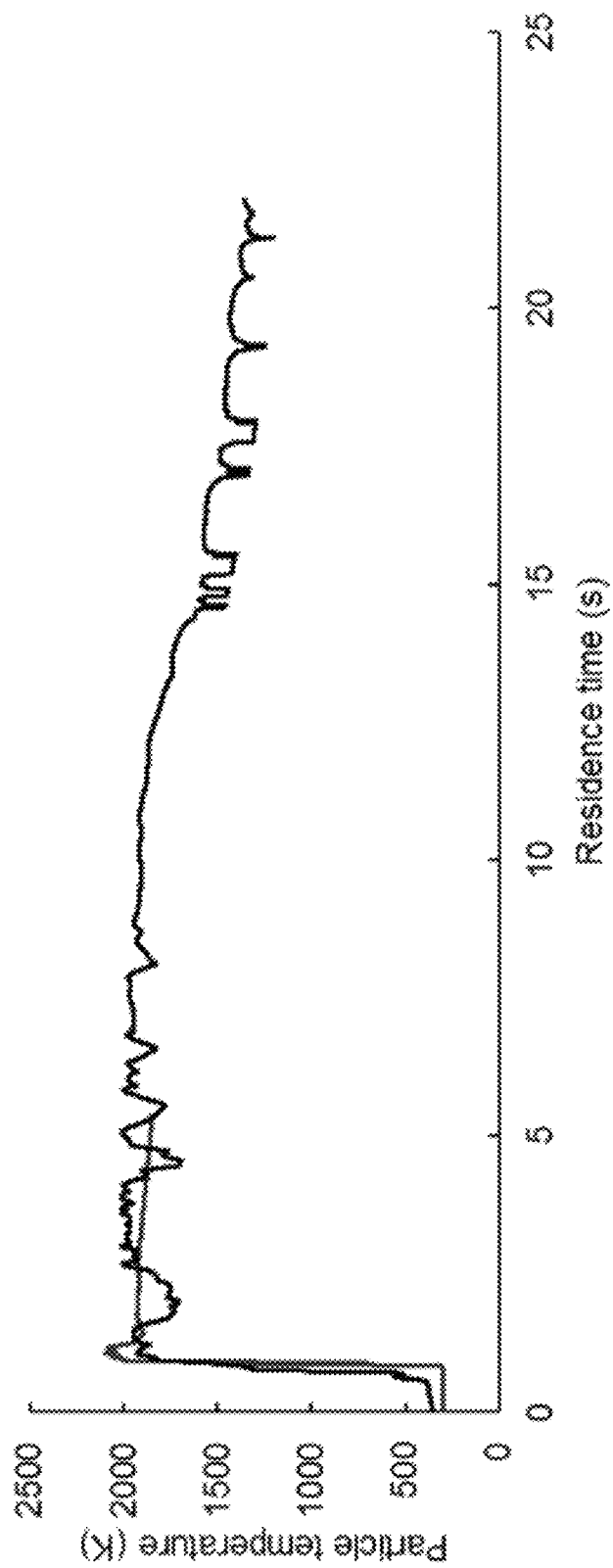
FIG. 8 is a graph comparing measured and simulated particle temperatures during early stage operation of a boiler in accordance with one aspect of the disclosure.

FIG. 8 is a graph comparing simulated and experimentally-measured particle temperatures as a function of residence time within an SPOC boiler. Good agreement was demonstrated between the simulated and experimentally observed particle temperature profiles shown in FIG. 8, and qualitative agreement was demonstrated for corresponding flame shapes and flow fields (data not shown). A stable coal flame was achieved in a co-axial flow without a heated wall, which remained stable under firing rate of less than about 8%.

Additional experimental measurements were obtained while operating the SPOC boiler with thermal inputs of 50 kW, 100 KW, and 120 KW of energy. The operating conditions for each thermal input are summarized in Table 2 below.

TABLE 2

| SPOC Experimental Operating Conditions. | | | |
|---|---|---|---|
| Parameter | | | |
| Thermal input | ~50 kW | ~100 kW | ~120 kW |
| Pressure | 15 bara | 15 bara | 15 bara |
| Oxygen concentration in oxidizer | 35% | 35% | 32% |
| Stoichiometric ratio | 1.08 | 1.12 | 1.07 |
| Residence time | ~10 s | ~5 s | ~4.2 s |
| $O_2$ concentration in flue gas | 1.9~2.3% | 2.5~3.5% | 0.7~1.2% |
| Burnout | >99.5% | >99.5% | 99.9% |

Additional experimental measurements were obtained for thermal inputs of 50 kW, 100 kW, and 120 kW of energy. The operating conditions for each thermal input are summarized in Table 2 below.

Figure 9A:
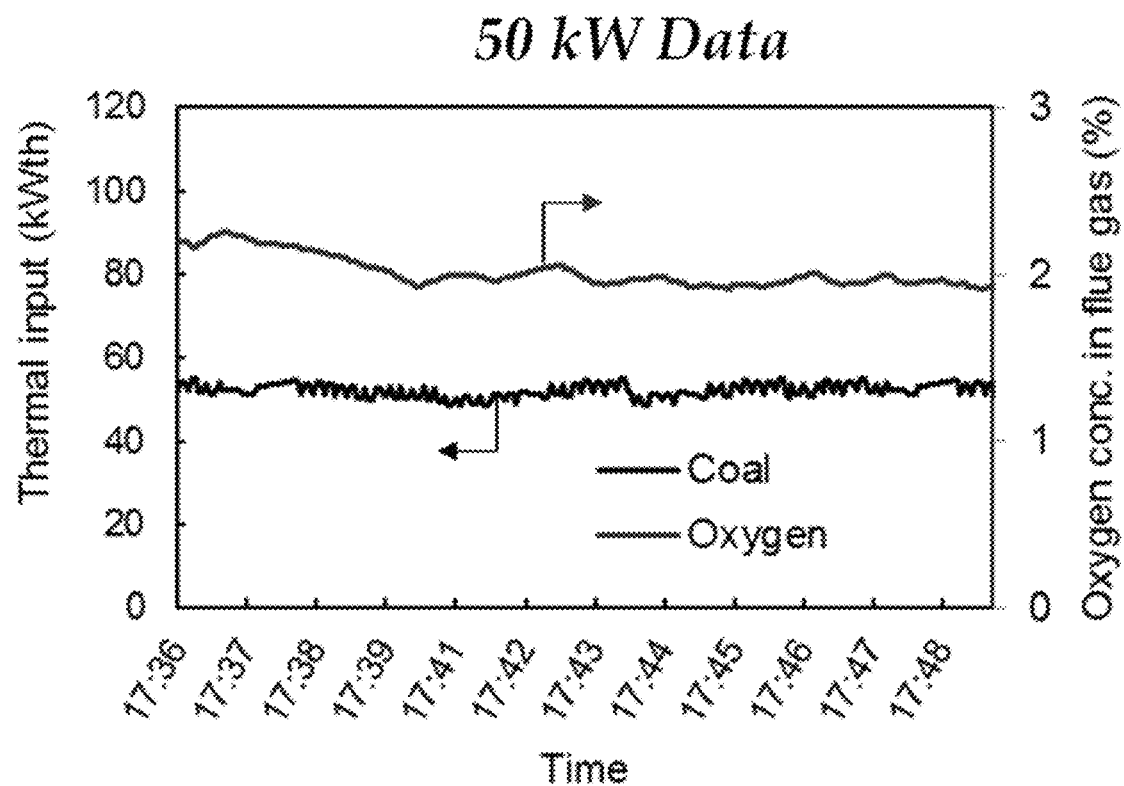
FIG. 9A is a graph summarizing thermal energy input and flue gas oxygen concentration during operation of a boiler in accordance with one aspect of the disclosure at an energy input of about 50 kW.
Figure 9B:
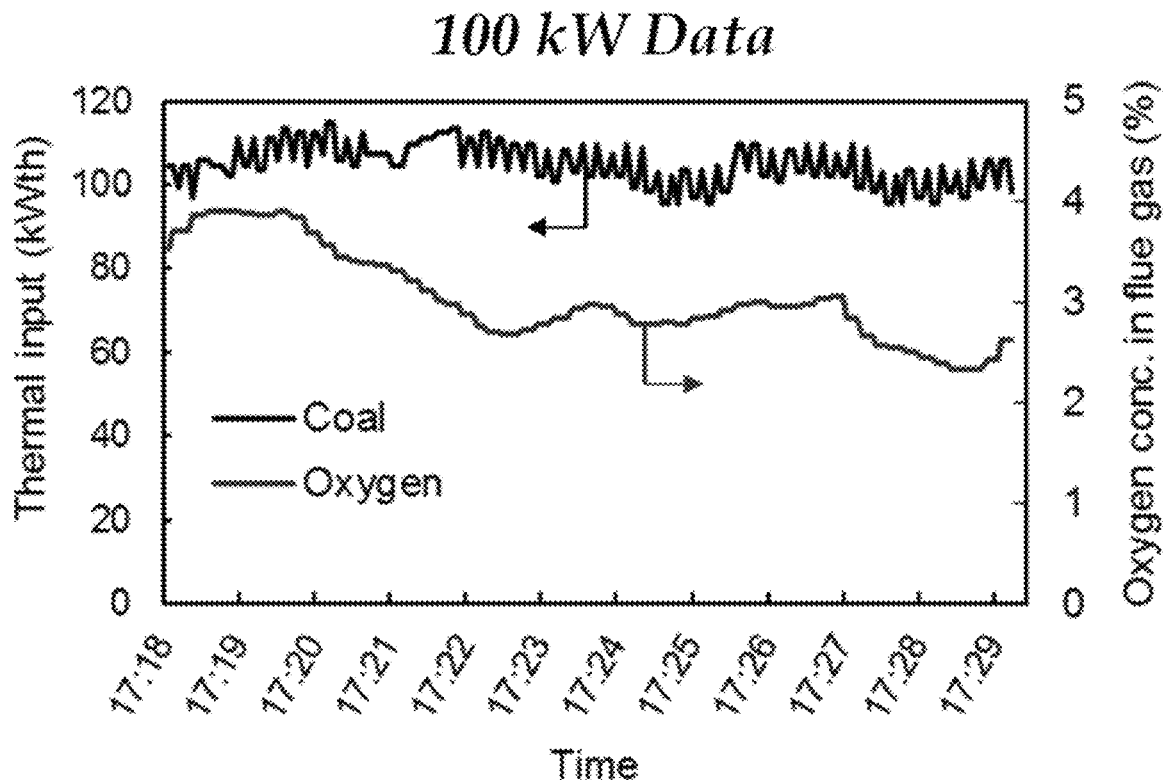
FIG. 9B is a graph summarizing thermal energy input and flue gas oxygen concentration during operation of a boiler in accordance with one aspect of the disclosure at an energy input of about 100 kW.
Figure 9C:
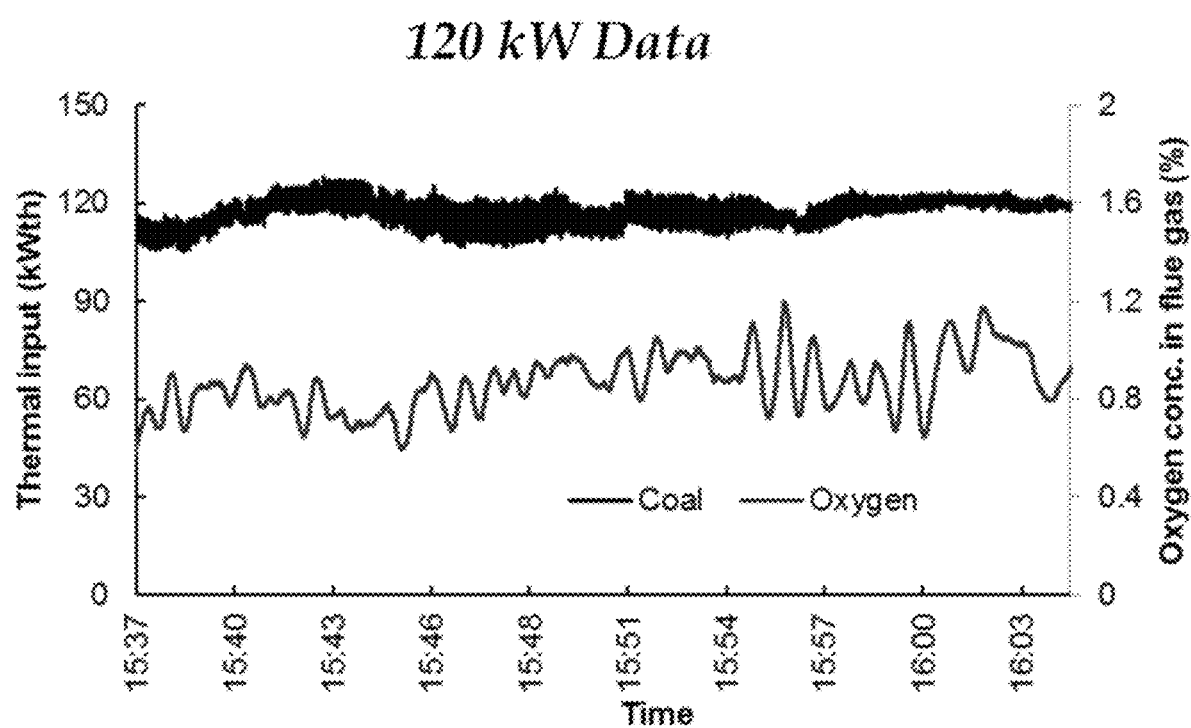
FIG. 9C is a graph summarizing thermal energy input and flue gas oxygen concentration during operation of a boiler in accordance with one aspect of the disclosure at an energy input of about 120 kW.

FIGS. 9A, 9B, and 9C are graphs summarizing representative time profiles of thermal input and oxygen concentration within the flue gas of the SPOC boiler operating with thermal inputs of 50 kW, 100 KW, and 120 KW, respectively. Essentially complete fuel combustion was be achieved even with 1 vol % oxygen in the flue gas, due to enhanced gasification reactions under pressurized combustion at 15 bar.

The results of these experiments demonstrated efficient operation of the SPOC boiler at a range of thermal energy inputs at flue gas oxygen concentrations as low as about 1%.

What is claimed is:

1. A modular combustion system for flexible energy generation, the system comprising:
   a plurality of combustion boilers operatively coupled in parallel or in series-parallel;
   at least one oxidizer supply unit operatively coupled to the plurality of combustion boilers, the at least one oxidizer supply unit providing an oxidizer stream to each of the plurality of combustion boilers in parallel or in series-parallel;
   at least one compressor and at least one air separation unit operatively coupled to the at least one oxidizer supply unit;
   at least one feeder operatively coupled to the plurality of combustion boilers, the at least one feeder providing fuel to each of the plurality of combustion boilers in parallel or in series-parallel;
   at least one particle removal unit operatively coupled to the plurality of combustion boilers and configured to remove particles from a flue gas output stream from the plurality of combustion boilers;
   a pollution removal unit comprising a direct contact column operatively coupled to the at least one particle removal unit and configured to remove pollutant gases from the flue gas output stream by transferring heat to a coolant and condensing moisture from the flue gas output stream to form a pollution removal unit output gas;
   an interheating unit operatively coupled to the pollution removal unit and the expansion unit, the interheating unit configured to transfer heat from the coolant of the pollution removal unit to the pollution removal unit output gas; and
   an expansion turbine operatively coupled to the at least one compressor and to the interheating unit, the expansion turbine configured to expand the heated pollution removal unit output gas and an output stream of the at least one compressor.

2. The modular combustion system of claim 1, further comprising at least one $CO_2$ purification unit operatively coupled to the pollution removal unit.

3. The modular combustion system of claim 1, further comprising at least one gas recycle unit operatively coupled to the plurality of combustion boilers to recycle flue gas from the last stage boiler to the first stage boiler.

4. The modular combustion system of claim 1, wherein the oxidizer gas is selected from air and a mixture of carbon dioxide and oxygen.

5. The modular boiler system of claim 1, wherein the fuel is coal.

* * * * *